US009677747B2

(12) United States Patent
Highbridge

(10) Patent No.: US 9,677,747 B2
(45) Date of Patent: Jun. 13, 2017

(54) CEILING CUTOUT COLLAR AND REMODEL LIGHT FIXTURE

(71) Applicant: RAB Lighting Inc., Northvale, NJ (US)

(72) Inventor: Doug Highbridge, Hopewell Junction, NY (US)

(73) Assignee: RAB Lighting Inc., Northvale, NJ (US)

(*) Notice: Subject to any disclaimer, the term of this patent is extended or adjusted under 35 U.S.C. 154(b) by 195 days.

(21) Appl. No.: 14/728,418

(22) Filed: Jun. 2, 2015

(65) Prior Publication Data

US 2015/0345758 A1 Dec. 3, 2015

Related U.S. Application Data

(60) Provisional application No. 62/006,511, filed on Jun. 2, 2014.

(51) Int. Cl.

*B60Q 1/00* (2006.01)
*B60Q 3/00* (2017.01)
*B60Q 11/00* (2006.01)
*F21V 15/04* (2006.01)
*F21V 21/02* (2006.01)
*F21S 8/00* (2006.01)
*F21V 15/01* (2006.01)
*F21S 8/02* (2006.01)
*F21V 21/04* (2006.01)

(52) U.S. Cl.

CPC .............. *F21V 21/02* (2013.01); *F21S 8/026* (2013.01); *F21S 8/03* (2013.01); *F21V 15/01* (2013.01); *F21V 21/042* (2013.01); *Y10T 29/49948* (2015.01)

(58) Field of Classification Search

CPC ........ F21V 21/02; F21V 15/01; F21V 21/042; F21S 8/026; F21S 8/03; Y10T 29/49948

USPC ................................ 362/369, 147, 148, 150

See application file for complete search history.

(56) References Cited

U.S. PATENT DOCUMENTS 2,664,132 A 12/1953 Leverte
3,683,173 A * 8/1972 Guth, Jr. .................. F21S 8/02 362/364
4,274,615 A 6/1981 Chan et al.
(Continued)

FOREIGN PATENT DOCUMENTS

EP 1048896 11/2000
EP 2180240 4/2010

OTHER PUBLICATIONS

Product Page, The Home Depot; 6 in. Starting Collar Take Off-Snap Together; May 15, 2015.

*Primary Examiner* — Andrew Coughlin
*Assistant Examiner* — Glenn Zimmerman
(74) *Attorney, Agent, or Firm* — SmithAmundsen LLC; Dennis S. Schell; Douglas G. Gallagher

(57) ABSTRACT

An illustrative remodel light assembly for installation from a front side surface of a ceiling or wall panel, such as drywall, includes a collar inserted though and secured to a panel cutout with bendable fingers, a light housing, a light trim including a trim flange, the flange for abutting a front side surface of the panel, and a plurality of self-actuating spring clips coupled to an outer periphery of one of the light housing and light trim, the self-actuating spring clips engaging the collar. The collar provides a secure structure that lines the cutout and upon which the trim flange and self-actuating spring clips secure the light assembly.

16 Claims, 9 Drawing Sheets

(56) References Cited

U.S. PATENT DOCUMENTS

| | | | | |
|---|---|---|---|---|
| 4,327,403 | A | 4/1982 | Capostagno et al. | |
| 4,528,764 | A | 7/1985 | Cobb | |
| 5,077,650 | A * | 12/1991 | Cestari | F21V 21/04 362/147 |
| 5,609,414 | A * | 3/1997 | Caluori | F21S 8/02 248/27.1 |
| 5,931,432 | A | 8/1999 | Herold et al. | |
| 7,673,842 | B2 | 3/2010 | Nevers et al. | |
| 7,854,537 | B2 | 12/2010 | Caluori | |
| 8,096,686 | B2 * | 1/2012 | Wilcox | F21V 21/04 362/147 |
| 8,215,805 | B2 | 7/2012 | Cogliano et al. | |
| 8,308,322 | B2 | 11/2012 | Santiago et al. | |
| 8,454,204 | B1 | 6/2013 | Chang et al. | |
| 8,506,134 | B2 | 8/2013 | Wilson et al. | |
| 2004/0213429 | A1 | 10/2004 | Seidler | |
| 2010/0149822 | A1 * | 6/2010 | Cogliano | F21S 8/02 362/365 |
| 2011/0267826 | A1 * | 11/2011 | Santiago | F21V 21/048 362/365 |
| 2012/0206926 | A9 * | 8/2012 | Chou | F21S 8/026 362/365 |
| 2015/0043223 | A1 | 2/2015 | Chen | |
| 2015/0086599 | A1 * | 3/2015 | Hammond | A61K 9/7007 424/422 |

* cited by examiner

CEILING CUTOUT COLLAR AND REMODEL LIGHT FIXTURE

CROSS-REFERENCE TO RELATED APPLICATIONS

This application claims the benefit of U.S. Provisional Patent Application No. 62/006,511, filed Jun. 2, 2014, and titled Ceiling Cutout Collar and Remodel Light Fixture, which is incorporated herein by reference

FIELD OF THE INVENTION

The present invention relates to installation of light fixtures, and particularly, to remodel light fixtures and installation without access to the rear of the mounting panel or surface.

BACKGROUND

New construction light pans that securely mount light fixtures and/or light trim modules are generally secured to ceiling joists or rafters located behind and supporting interior surface panels, also known in the industry as sheetrock, gypsum board and drywall. The pans are installed either before the ceiling panel is installed, or while access is still readily available from the back side of the panel. In contrast, when remodeling, a ceiling or wall panel is already in place and access from the back side of the panel is generally no longer available; therefore, all installation steps must be completed from the front side of the ceiling panel, generally through a cutout having a raw unfinished edge through which the remodel light fixture is installed. Additionally, a remodel light fixture usually must be secured to the panel cutout. The cutout in the panel, often lacks enough integrity and strength at the periphery of a cutout to support engagement of typical hardware such as formed spring steel clips used to secure the light fixture to the ceiling panel.

Prior art remodel light fixtures include light fixtures having a can housing with a flange that projects radially from a lower end of the can and hardware to secure the can housing to the ceiling panel. For example, typical hardware includes jackscrew and flag combinations located peripherally around the can at a distance from the flange that allows the ceiling panel to be captured between the flange and flags. To install, the flags are swung inwardly tangential to the surface of the can, the distal end of the can is inserted into the hole through the ceiling panel, then the flange is held flush against the front side of the ceiling panel. Held in this position, the flags are located around the outer circumference of the can at a depth from the flange so that they are just above the back side of the ceiling panel. While the flange is held flush against the ceiling panel, each jackscrew is actuated and the associated flag swings radially outward and the flag is drawn toward the back side of the ceiling panel, capturing and compressing the panel between the flag and the flange. The light trim is then secured to the can housing. In some cases, the light receptacle coupled to the housing must be secured to the trim before the trim is secured to the housing.

Such a prior art remodel light fixture can be cumbersome to hold in place while securing and also requires separate installation of the light housing and trim module. Additionally, the raw, unfinished circumference of the cutout from a front side surface of a ceiling panel is often uneven, imperfect, and not structurally sound, requiring care that the diameter is proper and any crumbled areas or other imperfections do not prevent a flag from catching a solid portion of the back side of the panel or from crumbling a portion of the periphery of the cutout as the flag is swung out and drawn toward the flange.

Another prior art remodel light fixture includes a housing can and spring clips that can be manually actuated from the interior of the can and that extend radially outward from the outer diameter of the can. To install, the can is positioned within the hole in the ceiling panel so that the bottom edge of the can is flush with the front side of the ceiling panel. While the can is held in this position, the spring clips are manually actuated from the interior of the can so that the clips press into the panel thickness between the front and back side surfaces, securing the can in place. Next the light trim is secured to the housing can. In some fixtures, the light receptacle coupled to the housing must be secured to a trim module before the trim module is secured to the housing.

Installation of such remodel light fixtures can be cumbersome, requiring portions of the light assembly be held in place while securing and performing additional assembly of the housing, light receptacle, and trim. Additionally, the raw, unfinished circumference of the cutout from a front side surface of a ceiling panel such as drywall may crumble, give way, or be imperfect in opening size so as to prevent secure engagement by the spring clips that press into it.

It is therefore desirable to provide a remodel light assembly that installs easily, quickly, and securely in panels such as drywall, even when imperfections in the cutouts are present.

SUMMARY

The present invention may comprise one or more of the features recited in the attached claims, and/or one or more of the following features and combinations thereof.

An illustrative remodel light assembly for installation from a front side surface of a ceiling or wall panel, such as drywall, includes a metal collar inserted though and secured to a panel cutout, a light housing, a light trim including a plurality of trim flanges, the flange for abutting a front side of the panel, and one a plurality of self-actuating spring clips coupled to an outer periphery of one of the light housing and light trim, the self-actuating spring clips engaging the metal collar. The collar provides a secure structure that lines the cutout and upon which the selected trim flange and self-actuating spring clips secure the light assembly.

In one illustrative embodiment, a remodel light assembly for installation in a ceiling or wall panel comprises a collar for insertion in a cutout, the collar including a sleeve having a collar flange at a first end and bendable fingers defined at a second end, the length of the sleeve between the first end and a base of the bendable fingers being sized to about fittingly receive the thickness of the interior panel; a light housing; and a light trim including a plurality of trim flanges, the flange for abutting a front side of the panel upon installation; and a plurality of self-actuating spring clips coupled to an outer periphery of one of the light housing and the light trim, the self-actuating spring clips for engaging the second end of the collar.

The light housing and light trim can be integrally formed. Alternatively, the light housing and light trim separately formed and can be coupled before installation through the collar. The trim flanges can include a recess providing clearance for the collar flange so that the trim flange contacts the front side of the panel upon installation. The collar sleeve length can be shorter than the thickness of the panel and the length of the plurality of fingers can be longer than the remaining thickness of the panel so that the fingers can be bent outwardly and extend along a length of the back side of the panel.

In another illustrative embodiment a collar for installation of a remodel light fixture from a front side surface of a ceiling or wall panel comprises a sleeve having a periphery sized and shaped to receive there though a housing of the light fixture; an outwardly turned flange defined at a first end of the sleeve; a plurality of outwardly bendable fingers defined around the entire periphery of a second end of the sleeve; and wherein the length of the sleeve between the first end and second end is about the thickness of the panel. A longitudinal break can be defined around the periphery of the sleeve and flange so as to allow adjustment of the size of the sleeve.

In yet another illustrative embodiment, a method of installing a remodel light assembly from a front side surface of a ceiling or wall panel comprises the steps of forming a cutout through the panel; inserting a collar into the cutout, the collar including a sleeve having a collar flange at a first end and bendable fingers defined at a second end, the length of the sleeve between the first end and a base of the bendable fingers being sized to about fittingly receive the thickness of the interior panel; holding the collar flange against a first side of the panel; reaching through the collar and bending the fingers outwardly and against the back side of the panel so as to secure the collar; and inserting a light housing and light trim through the collar, the light trim including a plurality of trim flanges, the flange abutting a front side of the panel upon insertion, and a plurality of self-actuating spring clips coupled to an outer periphery of one of the light housing and the light trim, the self-actuating spring clips engaging the second end of the collar upon insertion.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which.

DESCRIPTION OF THE ILLUSTRATIVE EMBODIMENTS

Figure 1:
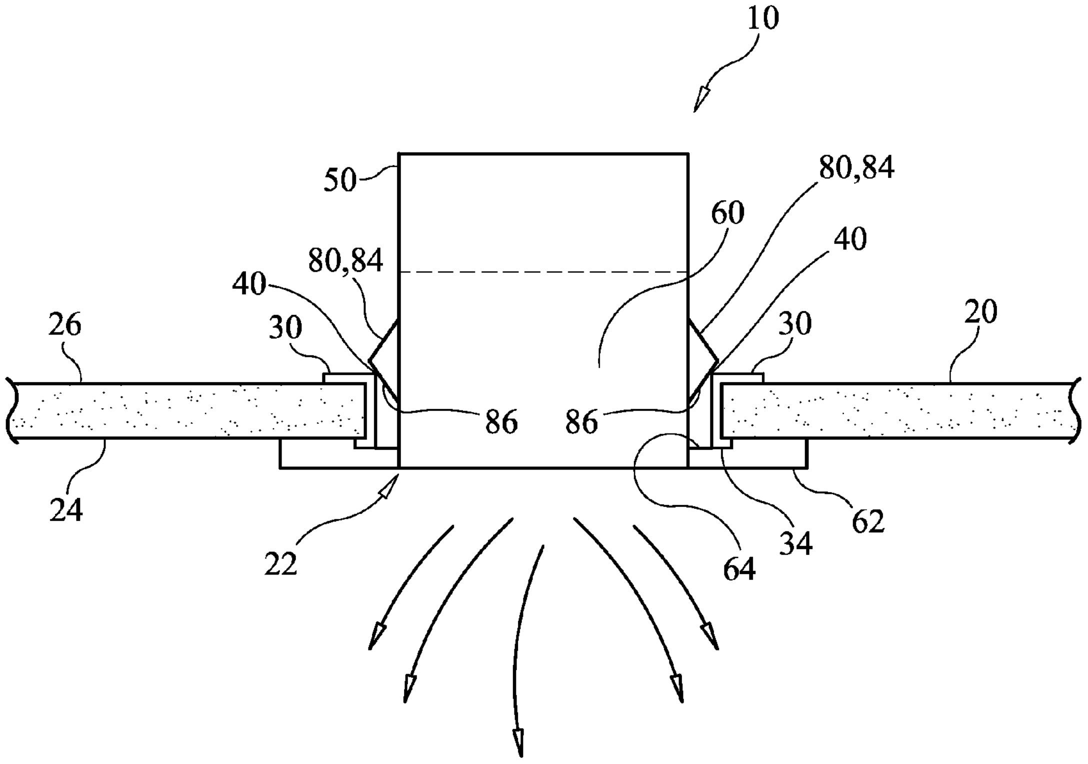
FIG. 1 is a vertical cross sectional view of a remodel light assembly and cutout collar installed in panel according to the present invention.

For the purposes of promoting and understanding the principals of the invention, reference will now be made to one or more illustrative embodiments illustrated in the drawings and specific language will be used to describe the same.

Referring to FIG. 1, an illustrative remodel light assembly 10 for installation from a front side surface of a ceiling or wall panel 20, such as drywall, includes a collar 30, a light housing 50, a light trim module 60, and a plurality of self-actuating spring clips 80. The collar 30 is inserted though and secured within a panel cutout 22.

Figure 2A:
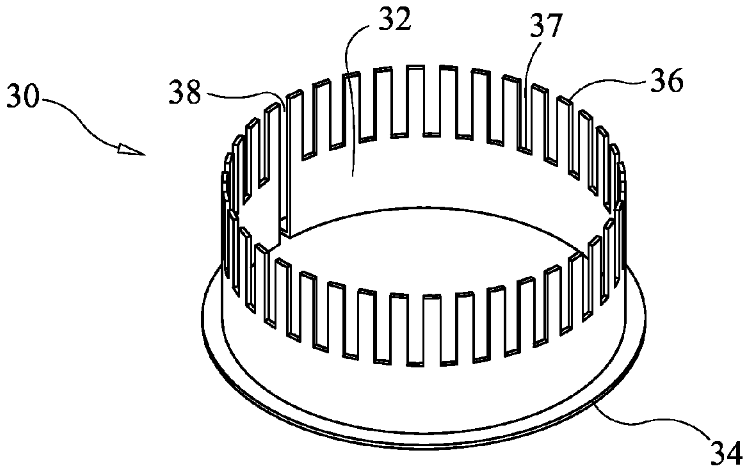
FIG. 2A, 2B, and 2C are a perspective, side, and bottom view, respectively, of the cutout collar of FIG. 1.
Figure 2B:
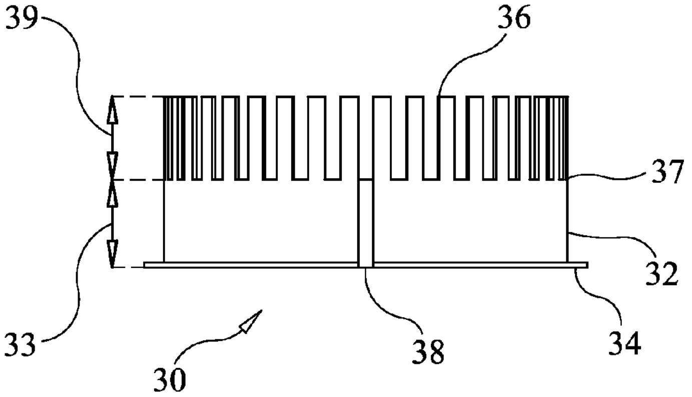
Figure 2C:
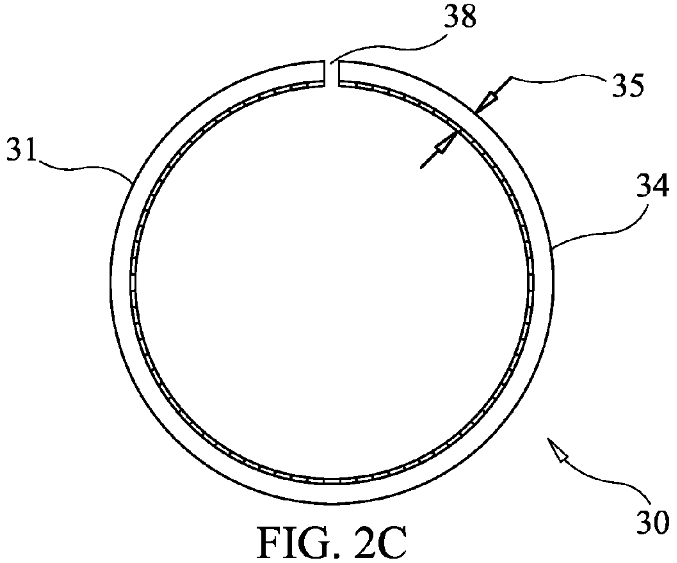
Figure 3:
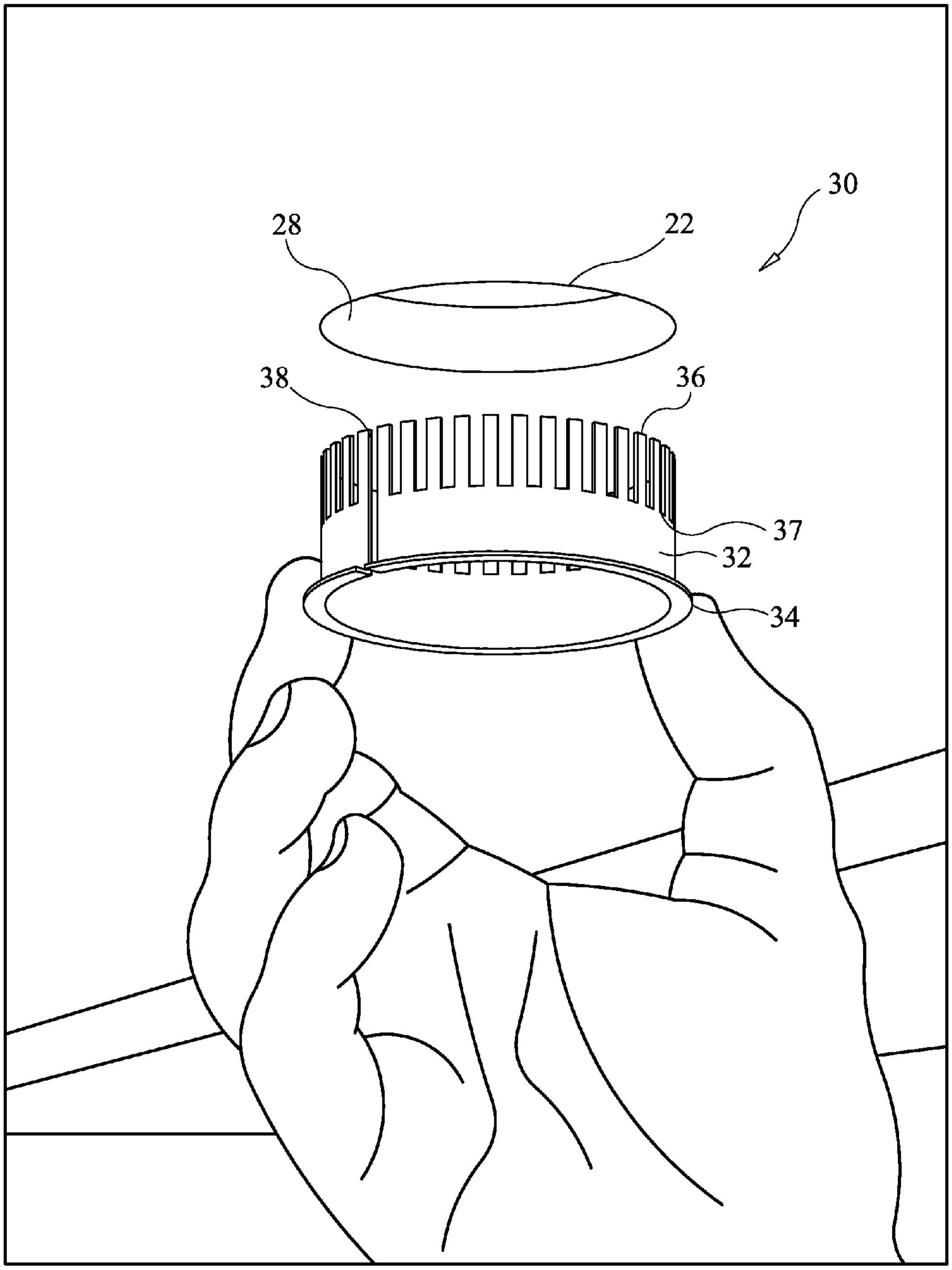
FIG. 3 is a perspective view from the front side of the ceiling panel illustrating the step of inserting the cutout collar of FIG. 1 in a cutout in the panel.

Referring to FIGS. 1-3, the collar 30 can be made from a hand bendable metal and provides a durable structure that fits snuggly within and lines the cutout 22, increasing the durability of the cutout 22 of the panel 20. The collar 30 thereby provides the raw edge 28 (FIG. 3) of the cutout 22 with structural integrity for the self-actuating spring clips 80 that secure the light assembly at the back side 26 of the panel.

Figure 7:
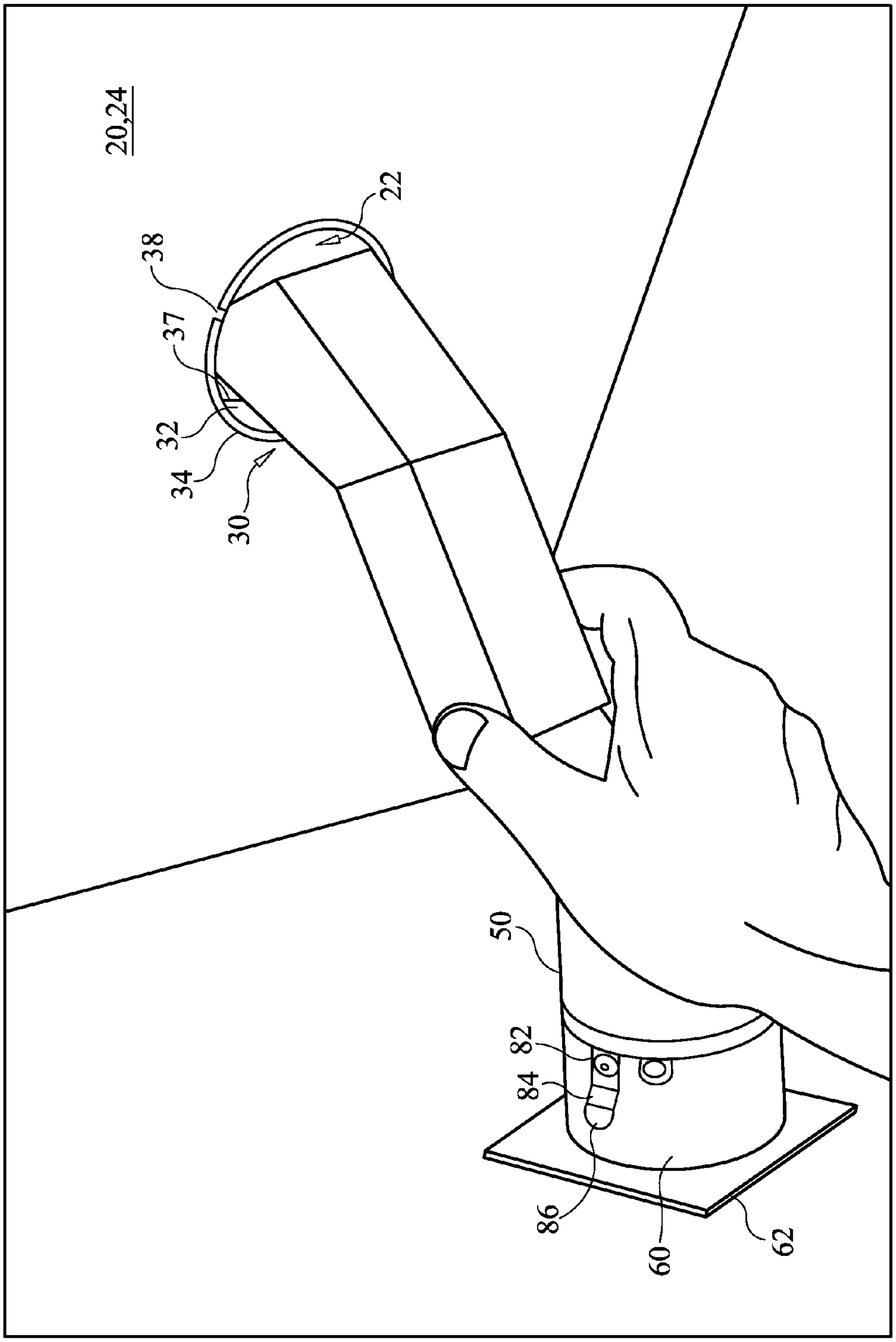
FIG. 7 is a perspective view from the front side of the panel illustrating insertion of the remodel light fixture of FIG. 1 through the cutout collar of FIG. 6.
Figure 8:
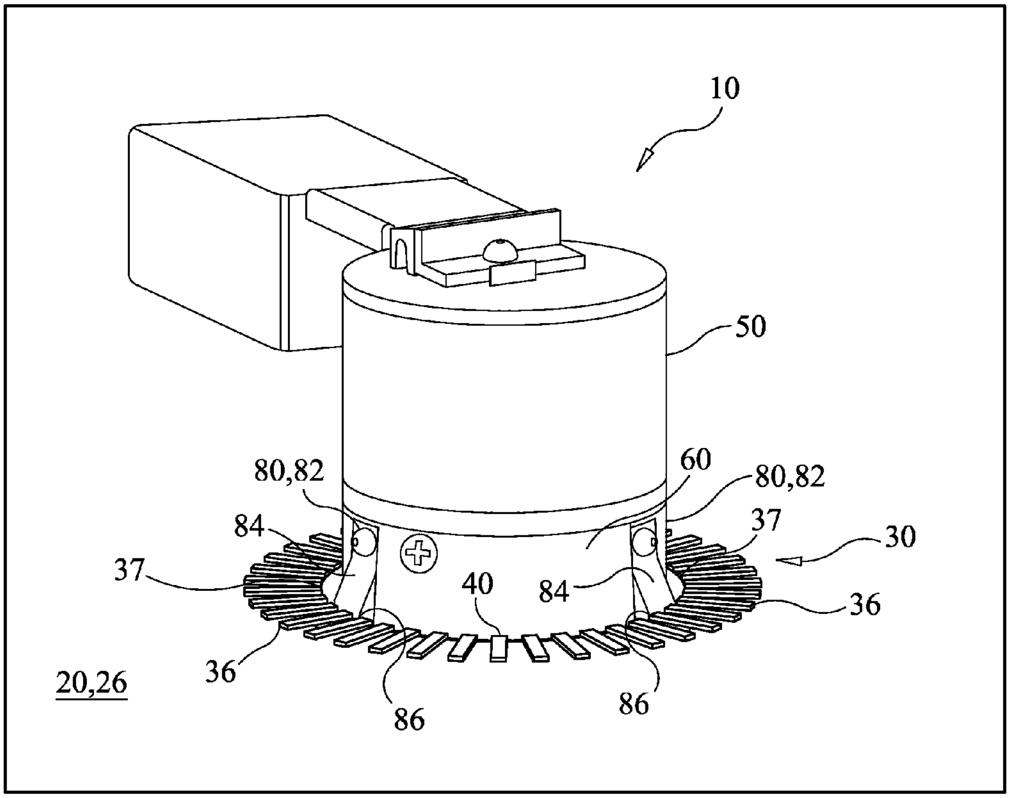
FIG. 8 is a perspective view from the back side of the panel illustrating the remodel light fixture and cutout collar of FIG. 1 both installed in the in the ceiling panel.
Figure 9:
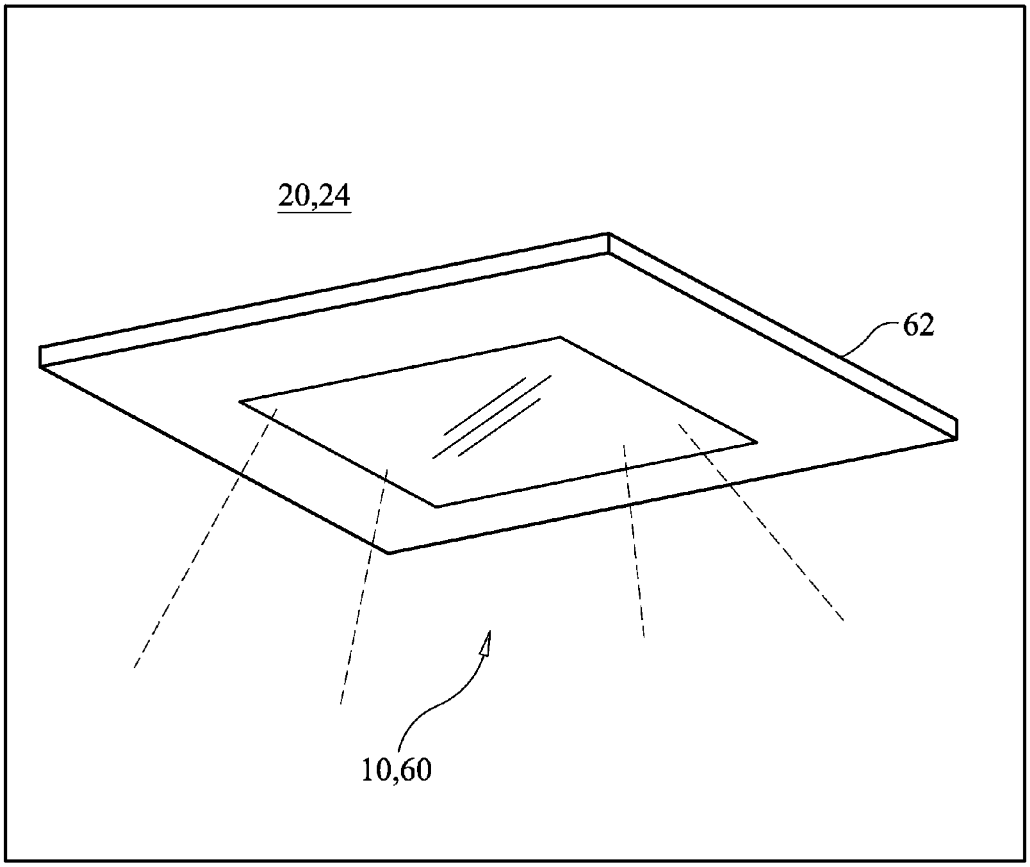
FIG. 9 is a perspective view from the front side of the panel illustrating the remodel light fixture of FIG. 1 with a square trim flange installed in the cutout in the panel.

The light trim module 60 includes a trim flange 62 as shown in FIGS. 7 and 9. In the installed position, the trim flange 62 abuts the front side 24 of the panel 20 as shown in FIGS. 1 and 9. This abutment prevents upward longitudinal movement of the light assembly 10. The self-actuating spring clips 80 engaged against the collar 30 at bend 40 of the fingers 36 prevent downward longitudinal movement of the light assembly 10, as shown in FIGS. 1 and 8. The self-actuating spring clips 80 engaged against the collar 30 also prevent lateral movement of the assembly 10 within the collar 30 and the cutout 22.

Figure 4:
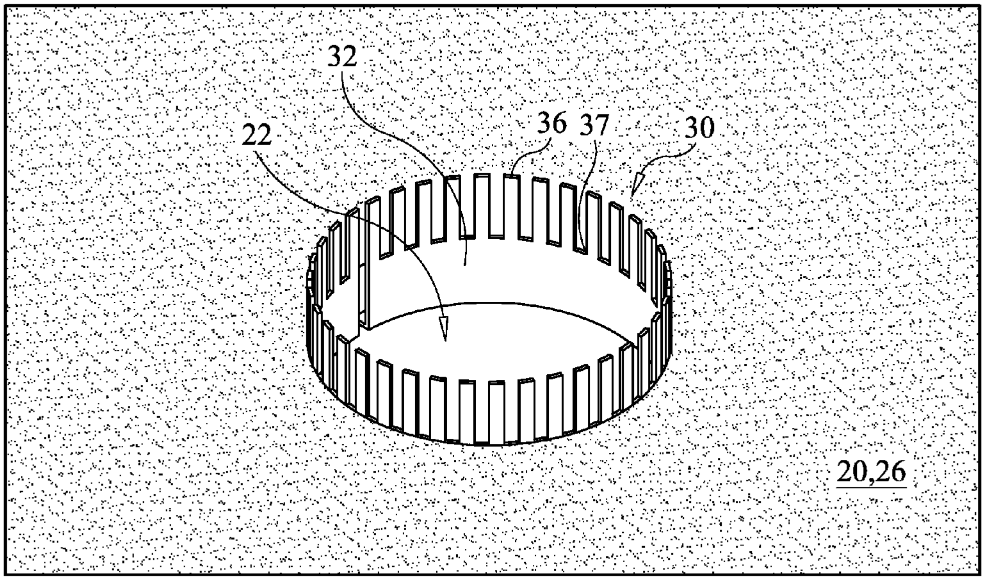
FIG. 4 is a perspective view from the back side of the panel illustrating the cutout collar of FIG. 1 positioned in the cutout in the panel.
Figure 5:
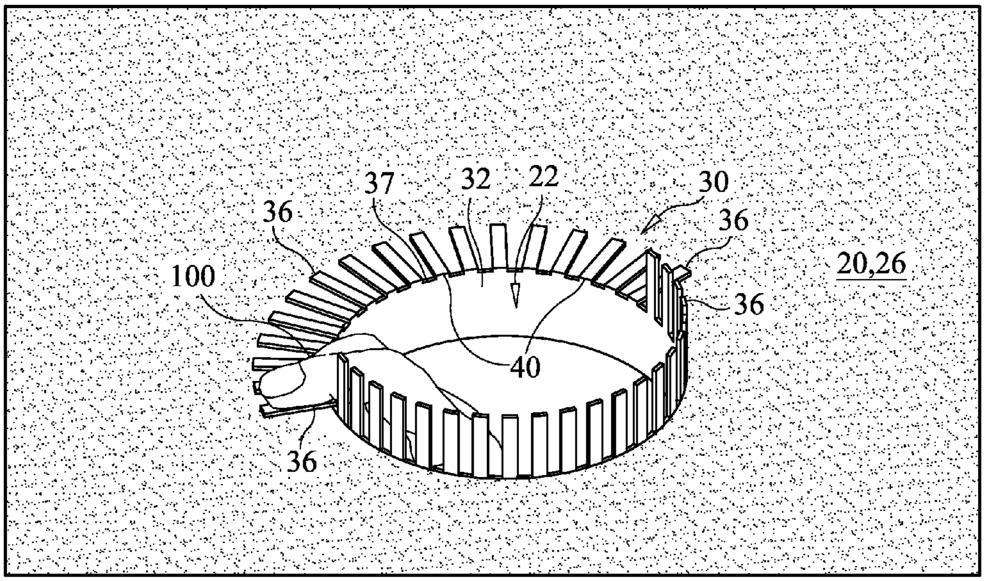
FIG. 5 is a perspective view from the back side of the panel illustrating the step of securing the cutout collar of FIG. 1 in the cutout of the panel.
Figure 6:
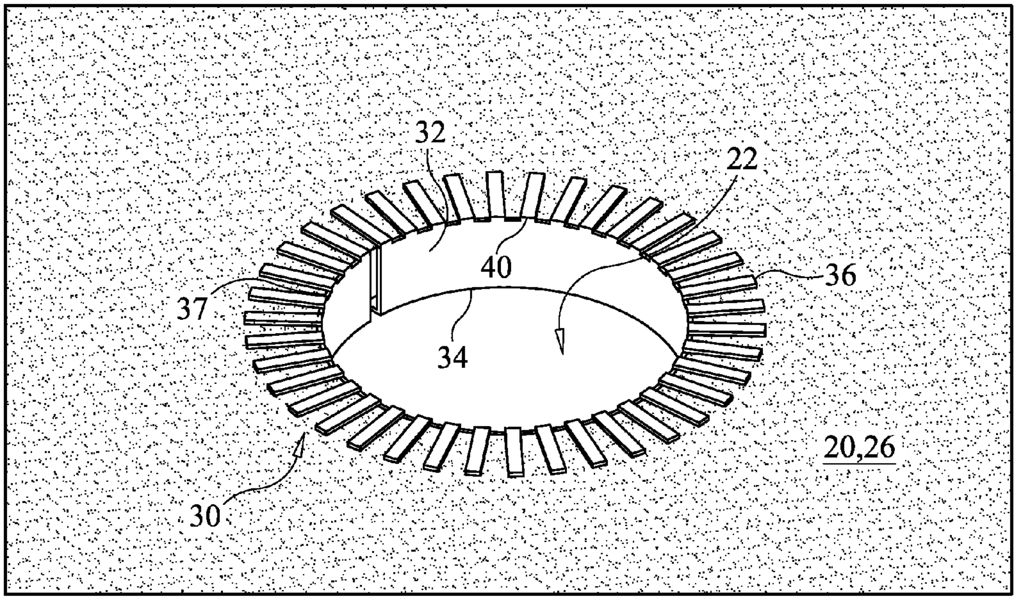
FIG. 6 is a perspective view from the back side of the panel illustrating the cutout collar of FIG. 1 secured in the cutout in the panel.

Referring to FIG. 3, the collar 30 can be installed by hand in the cutout 22 formed through the panel 20 with a few easy, quick steps. First, the collar 30 is inserted into the cutout 22, fingers 36 first, until the outwardly extending collar flange 34 is flush with the front side 24 of the panel 24, as shown in FIG. 7. In this position, the sleeve 32 abuts the raw surface 28 of the cutout 22 and the fingers 36 extend above the back side 26 of the panel 20, as shown in FIG. 4. Second, referring to FIG. 5, by reaching through the collar 30 from the front side 24 with a finger 100 or with a tool or other implement, the fingers 36 around the entire periphery of the collar 30 are bent outwardly and downwardly so that they contact the back side 26, forming bend 40 adjacent the intersecting edge of raw surface 28 and back side 26 of panel 20. Referring to FIGS. 6 and 7, the fingers 36 contacting the back side 26 of the panel 20 secures the collar 30 within the cutout 22 and holds the flange 34 tight against the front side 24 of the panel.

The collar 30 can be formed from about 26 gauge galvanized steel, which is strong enough to hold up to the pressure of formed steel self-actuating spring clip 80, yet pliable enough at fingers 36 so that the fingers can be bent manually. Heavier or lighter gauge and/or alternate materials can be substituted to accommodate variation in the application, for example, the size of the cutout 22 and the weight of the light assembly 10 being supported. As can be noted particularly in FIG. 6, the length 33 (FIG. 2B) of the sleeve 34 between the collar flange 34 and the base 37 of the fingers 36 can be about the same as the thickness as the panel 20, for example, ⅝ inch, so that the bend 40 of the fingers is coplanar with the back side 26 of the panel 20. Alternatively, the length 33 of the sleeve 32 between the collar 34 and the base 37 can be less than the thickness of the panel 20 and the length 39 of the fingers 36 accommodates a range of thickness of panels 20 with a single collar size, with bend 40 forming in the fingers 36 at the back side 26 of the panel 20. As shown in FIG. 2B, the length 39 of the fingers 36 can be about the same as the length 33 of the sleeve, for example, ⅝ inch.

Referring to FIGS. 2A-2C, collar 32 has an interior diameter 31 of the sleeve 32 that is sized to receive there through the light housing 50 and upper portion of the trim module 60. The diameter of the cutout 22, is also about the diameter 31 of the collar 30, for example 2⅜ inch. The width 35 of the outwardly turned collar flange 34 is wide enough to prevent insertion of the collar 30 all the way through an imprecisely formed cutout 20, for example, about 3/16 inch, including preventing the collar 30 from being pulled through the cutout 22 when bending fingers 36 and when inserting the light housing 50 and trim module 60 into the collar 30.

The optional longitudinal break 38 can be defined at a point around the periphery of the sleeve 32 and flange 34 of the collar 30 so as to allow adjustment of the size of the sleeve, for example, to enhance the fit of the collar 30 with the diameter of the cutout. For example, during insertion into cutout 22, the break 38 allows for slight compression of the collar 30, reducing the diameter 31 slightly until inserted into cutout 22, and upon release, providing for the sleeve 32 to spring outwardly tight against the raw surface 28 of the cutout. The shape of cutout 22 and collar 30 is not limited to circular, but can also be square or other shapes desired based on the design of the light trim 60.

Referring to FIG. 7, the self-actuating spring clips 80 can be made of formed steel and can include a flat mount portion 82, a radially outward projection portion 84, and a radially inward projection portion 86. Other self-actuating spring clip designs known in the art can be substituted. The self-actuating spring clips 80 can be mounted or otherwise coupled with either of the light housing 50 or light trim 60, for example, three self-actuating spring clips mounted equidistant around the periphery of the light trim.

The light housing 50 and light trim module 60 can be integrally formed, for example, the two portions molded, cast, or otherwise formed as a single body. Alternatively, the light housing 50 and light trim module 60 can be separately formed and can be coupled either during manufacturing or immediately prior to installation through the collar 30. Coupling facilitates selection of a light trim module 60, 160 from a plurality of differently finished and/or shaped trim modules with a common light housing 50, 150.

With at least some embodiments according to the present disclosure, once the cutout collar 30 is installed, advantageously the coupled or integral light housing 50 and trim module 60 are installed into the collar 30 with a single step. Referring to FIG. 7, the coupled light housing 50 and trim module 60, including any drivers, wire connections, or other accessories, are inserted through the collar 30 until the trim flange 62 abuts the front side 24 of the panel 20, as shown in FIGS. 1 and 9. Referring to FIGS. 1 and 8, in this position, the self-actuating spring clips 80 engage against the collar 30 at bend 40 of the fingers 36, preventing downward longitudinal and lateral movement of the light assembly 10 relative to the collar 30 and cutout 22.

Advantageously, the trim flange 62 can include a recess 64 (FIGS. 1 and 7) providing clearance for the collar flange 34 so that at least an outer portion of the trim flange abuts and flushly contacts the front side 24 of the panel 20 upon installation.

Without the use of the collar 30 secured to and providing a durable structure lining the cutout 22, the raw surface 28 adjacent the back side 26 would be likely crushed and/or crumbled by the formed steel self-actuating spring clips 80. More specifically, referring to FIG. 8, as can be appreciated with the self-actuating spring clips portion 86 forced outward by the spring pressure of steel formed self-actuating spring clips 80, contact with a portion of the collar 30 rather than the raw edge 28 of the cutout 20 prevents breakage of the raw edge 28, which could loosen or even prevent the retention of the light assembly 10 in the cutout 20.

Figure 10:
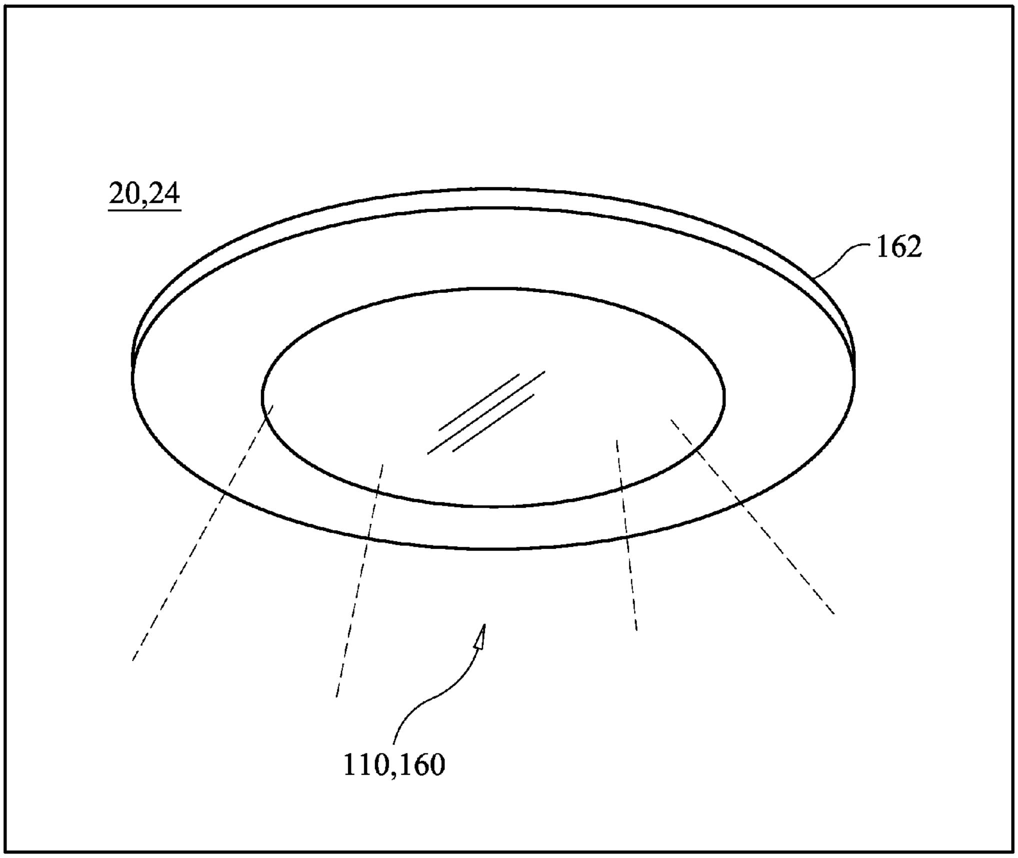
FIG. 10 is a perspective view from the front side of the panel illustrating the remodel light fixture of FIG. 1 with a round trim flange installed in the cutout in the panel.

A second illustrative remodel light assembly 110 shown in FIG. 10 for installation from a front side surface of a ceiling or wall panel 20, such as drywall, includes a metal collar 30, a light housing 50, and an alternative light trim module 160, including a round trim flange 162, rather than a square trim flange 62 associated with trim module 60.

While the invention has been illustrated and described in detail in the foregoing drawings and description, the same is to be considered as illustrative and not restrictive in character, it being understood that only illustrative embodiments thereof have been shown and described and that all changes and modifications that come within the spirit and scope of the invention as defined in the claims and summary are desired to be protected.

The invention claimed is:

1. A remodel light assembly for installation from a front side surface of a panel forming at least one of a ceiling or wall, comprising:

a collar for insertion in a cutout, the collar including a sleeve, a collar flange, and bendable fingers, the collar flange defined at a first end of the sleeve and the bendable fingers defined at a second end of the sleeve, a length of the sleeve between the first end and a base of the bendable fingers being sized to fittingly receive a thickness of the panel;

a light housing;

a light trim including a trim flange, the flange for abutting a front side surface of the panel upon installation; and a plurality of self-actuating spring clips coupled to an outer periphery of one of the light housing and the light trim, the self-actuating spring clips retracting upon initial insertion through the collar and extending and engaging the second end of the collar upon full insertion; and wherein the light housing and the light trim are sized to install through the collar from the front side surface of the panel.

2. The remodel light assembly of claim 1, wherein the light housing and light trim are integrally formed.

3. The remodel light assembly of claim 1, wherein the light housing and light trim can be coupled before installation through the collar.

4. The remodel light assembly of claim 1, wherein the trim flange includes a recess providing clearance for the collar flange so that at least a portion of the trim flange contacts the front side surface of the panel upon installation.

5. The remodel light assembly of claim 1, wherein the collar sleeve length is shorter than the thickness of the panel and the length of the plurality of fingers is longer than the remaining thickness of the panel so that the fingers can be bent outwardly and extend along a length of a back side surface of the panel.

6. The remodel light assembly of claim 1, wherein the light trim is selected from a plurality of different light trims.

7. The remodel light assembly of claim 1, wherein the self-actuating spring clips engaged the collar at the bend of the fingers.

8. The remodel light assembly of claim 1, wherein the collar is secured from upward and downward movement by the panel captured between the flange and bent fingers of the collar.

9. A method of installing a remodel light assembly from a front side surface of a panel forming at least one of a ceiling or a wall panel, comprising the steps of:

forming a cutout through the panel;

inserting a collar into the cutout, the collar including a sleeve , a collar flange, and bendable fingers, the collar flange defined at a first end of the sleeve and the bendable fingers defined at a second end of the sleeve, a length of the sleeve between the first end and a base of the bendable fingers being sized to fittingly receive a thickness of the panel;

holding the collar flange against a front side surface of the panel;

reaching through the collar and bending the fingers outwardly and against a back side surface of the panel so as to secure the collar in the cutout; and inserting a light housing and light trim through the collar, the light trim including a trim flange and a plurality of self-actuating spring clips coupled to an outer periphery of one of the light housing and the light trim, and upon insertion, the flange abutting the front side surface of the panel and the plurality of self-actuating spring clips engaging the second end of the collar.

10. The method of claim 9, wherein the light trim is selected from a plurality of different light trims.

11. The method of claim 9, wherein the light housing and light trim are coupled before installation through the collar.

12. The method of claim 9, wherein the light housing and light trim are integrally formed.

13. The method of claim 9, wherein the self-actuating spring clips engage the collar at the bend of the fingers.

14. The method of claim 9, wherein the collar is secured from upward and downward movement by the panel captured between the flange and bent fingers of the collar.

15. A remodel light assembly installed from a front side surface of panel forming at least one of a ceiling or wall panel, comprising:

a light housing;

a collar for insertion in a cutout, the collar including a sleeve, a collar flange, and bendable fingers, the collar flange defined at a first end of the sleeve and the bendable fingers defined at a second end of the sleeve;

a light trim coupled to the light housing and including a trim flange, the flange for abutting a front side surface of the panel upon installation; and a plurality of self-actuating spring clips coupled to an outer periphery of one of the light housing and the light trim; and wherein steps of installing include:

forming a cutout through the panel;

inserting a collar into the cutout;

holding the collar flange against the front side surface of the panel;

reaching through collar and bending the fingers outwardly and against the back side surface of the panel to secure the collar; and inserting the light housing and light trim through the collar.

16. The remodel light assembly of claim 15 wherein a length of the sleeve between the first end and a base of the bendable fingers is sized to fittingly receive a thickness of the panel.

* * * * *